US011350078B2

United States Patent
Tang et al.

(10) Patent No.: US 11,350,078 B2
(45) Date of Patent: May 31, 2022

(54) 3D POSE DETECTION BY MULTIPLE 2D CAMERAS

(71) Applicant: FANUC CORPORATION, Yamanashi (JP)

(72) Inventors: Te Tang, Fremont, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/839,331

(22) Filed: Apr. 3, 2020

(65) Prior Publication Data

US 2021/0314551 A1 Oct. 7, 2021

(51) Int. Cl.
*H04N 13/275* (2018.01)
*G06K 9/00* (2022.01)
*H04N 13/25* (2018.01)
*G06V 20/64* (2022.01)

(52) U.S. Cl.
CPC ......... *H04N 13/275* (2018.05); *G06V 20/653* (2022.01); *H04N 13/25* (2018.05); *G06T 2207/10012* (2013.01)

(58) Field of Classification Search
CPC . B05D 3/06; B41J 11/002; B41J 2/01; B41M 5/0047; B41M 5/0064; B41M 7/0081; C08F 220/34; C08F 265/06; C08F 2/44; C09D 11/101; C09D 11/107; C09D 11/30; C09D 11/322
See application file for complete search history.

(56) References Cited

U.S. PATENT DOCUMENTS

| 6,590,669 B1* | 7/2003 | Wagner | G06T 7/55 356/601 |
|---|---|---|---|
| 2006/0088203 A1* | 4/2006 | Boca | G06T 7/75 382/153 |
| 2014/0049607 A1* | 2/2014 | Amon | H04N 19/537 348/43 |
| 2018/0143682 A1* | 5/2018 | Larson | G02B 27/0172 |
| 2018/0260793 A1* | 9/2018 | Li | G06N 3/084 |
| 2019/0122380 A1* | 4/2019 | Cao | G06T 7/75 |

(Continued)

OTHER PUBLICATIONS

Bugra, Tekin, Sudipta N. Sinha, Pascal, Fua,; Real-Time Seamless Single Shot 6D Object Pose Prediction, 2017, 292-301.

*Primary Examiner* — Joon Kwon
(74) *Attorney, Agent, or Firm* — John A. Miller; Shumaker, Loop & Kendrick, LLP

(57) ABSTRACT

A system and method for obtaining a 3D pose of an object using 2D images from multiple 2D cameras. The method includes positioning a first 2D camera so that it is directed towards the object along a first optical axis, obtaining 2D images of the object by the first 2D camera, and extracting feature points from the 2D images from the first 2D camera using a first feature extraction process. The method also includes positioning a second 2D camera so that it is directed towards the object along a second optical axis, obtaining 2D images of the object by the second 2D camera, and extracting feature points from the 2D images from the second 2D camera using a second feature extraction process. The method then estimates the 3D pose of the object using the extracted feature points from both of the first and second feature extraction process.

18 Claims, 6 Drawing Sheets

(56) References Cited

U.S. PATENT DOCUMENTS

| | | | |
|---|---|---|---|
| 2019/0147221 A1* | 5/2019 | Grabner | G06T 7/75 |
| | | | 382/103 |
| 2019/0355150 A1* | 11/2019 | Tremblay | G06T 7/73 |
| 2020/0070352 A1* | 3/2020 | Larzaro-Gredilla | ........ |
| | | | G06K 9/6297 |
| 2020/0138382 A1* | 5/2020 | Cao | A61B 5/055 |
| 2020/0311855 A1* | 10/2020 | Tremblay | G06T 1/0014 |

\* cited by examiner

3D POSE DETECTION BY MULTIPLE 2D CAMERAS

BACKGROUND

Field

This disclosure relates generally to a system and method for estimating a 3D pose of an object using multiple 2D cameras and, more particularly, to a system and method for estimating a 3D pose of an object using multiple 2D cameras and a learned-based neural network or a vector field estimation feature extraction process, where the system and method have particular application for robot control.

Discussion of the Related Art

Robots perform a multitude of tasks including pick and place operations, where the robot picks up and moves objects from one location, such as a conveyor belt, to another location, such as a collection bin, where the location and orientation of the objects, known as the object's 3D pose, are slightly different. Thus, in order for the robot to effectively pick up an object, the robot often needs to know the 3D pose of the object. Various techniques for determining the 3D pose of objects for this purpose use a 3D camera that obtains 3D images of the object in real time, where the 3D images identify distance measurements to many points in the field-of-view of the camera, which are sent to the robot controller. These techniques may build a 3D map of a scene using structured light and then search for objects in the map by identifying 3D features of the objects. The use of 3D cameras to determine the 3D pose of objects for robotic applications has proven to be effective. However, 3D cameras are costly devices and often operate slower than what is desired.

One technique that is known in the art to obtain a 3D pose of an object for robotic applications and otherwise employs a 2D camera. This technique takes a single 2D color image of a scene and processes the image using a fully-convolutional architecture. An algorithm divides the image into a 2D grid including S ×S cells and identifies objects in the cells. The algorithm projects a bounding box around each object in the image and predicts the 2D location of the eight corners of the box. However, this technique for predicting the corners of the bounding boxes has limitations of accuracy and a low robustness to occlusion.

Some of the processes referred to above for determining the 3D pose of an object employ artificial intelligence (AI), which is a part of computer science that employs algorithms that allow software applications to learn from their environment and make decisions therefrom to achieve a certain result. Machine learning is a part of AI that employs software applications that acquire their own knowledge by analyzing vast amounts of raw input data in an iterative manner to extract patterns from the data and to allow the software application to learn to perform a task without being specifically programmed to perform that task. Deep learning is a particular type of machine learning that provides greater learning performance by representing a certain real-world environment as a hierarchy of increasing complex concepts.

Deep learning typically employs a software structure comprising several layers of neural networks that perform nonlinear processing, where each successive layer receives an output from the previous layer. Generally, the layers include an input layer that receives raw data from a sensor, a number of hidden layers that extract abstract features from the data, and an output layer that identifies a certain thing based on the feature extraction from the hidden layers. The neural networks include neurons or nodes that each has a "weight" that is multiplied by the input to the node to obtain a probability of whether something is correct. More specifically, each of the nodes has a weight that is a floating point number that is multiplied with the input to the node to generate an output for that node that is some proportion of the input. The weights are initially "trained" or set by causing the neural networks to analyze a set of known data under supervised processing and through minimizing a cost function to allow the network to obtain the highest probability of a correct output.

Deep learning neural networks are often employed to provide image feature extraction and transformation for the visual detection and classification of objects in an image, where a video or stream of images can be analyzed by the network to identify and classify objects and learn through the process to better recognize the objects. Thus, in these types of networks, the system can use the same processing configuration to detect certain objects and classify them differently based on how the algorithm has learned to recognize the objects.

SUMMARY

The following discussion discloses and describes a system and method for obtaining a 3D pose of an object using 2D images from multiple 2D cameras. The method includes positioning a first 2D camera so that it is directed towards the object along a first optical axis, obtaining 2D images of the object by the first 2D camera, and extracting feature points from the 2D images from the first 2D camera using a first feature extraction process. The method also includes positioning a second 2D camera so that it is directed towards the object along a second optical axis where the first and second optical axes are at an angle relative to each other, obtaining 2D images of the object by the second 2D camera, and extracting feature points from the 2D images from the second 2D camera using a second feature extraction process. The method then estimates the 3D pose of the object using the extracted feature points from both of the first and second feature extraction process. The first and second feature extraction processes can use a learned-based neural network or a vector field estimation process. Estimating the 3D pose of the object using the extracted feature points from both of the first and second feature extraction process can also use a perspective-n-point algorithm that compares a 2D projection of a 3D virtual model of the object with a 2D projection of the object having feature locations for both of the first and second feature extraction processes and then averaging the two 3D poses.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a system and method that employs a learned-based neural network for estimating a 3D pose of an object using multiple 2D cameras and a learned-based neural network or a vector field estimation feature extraction process is merely exemplary in nature, and is in no way intended to limit the invention or its applications or uses. For example, the system and method have application for determining the position and orientation of an object being grasped by a robot. However, the system and method may have other applications.

Figure 1:
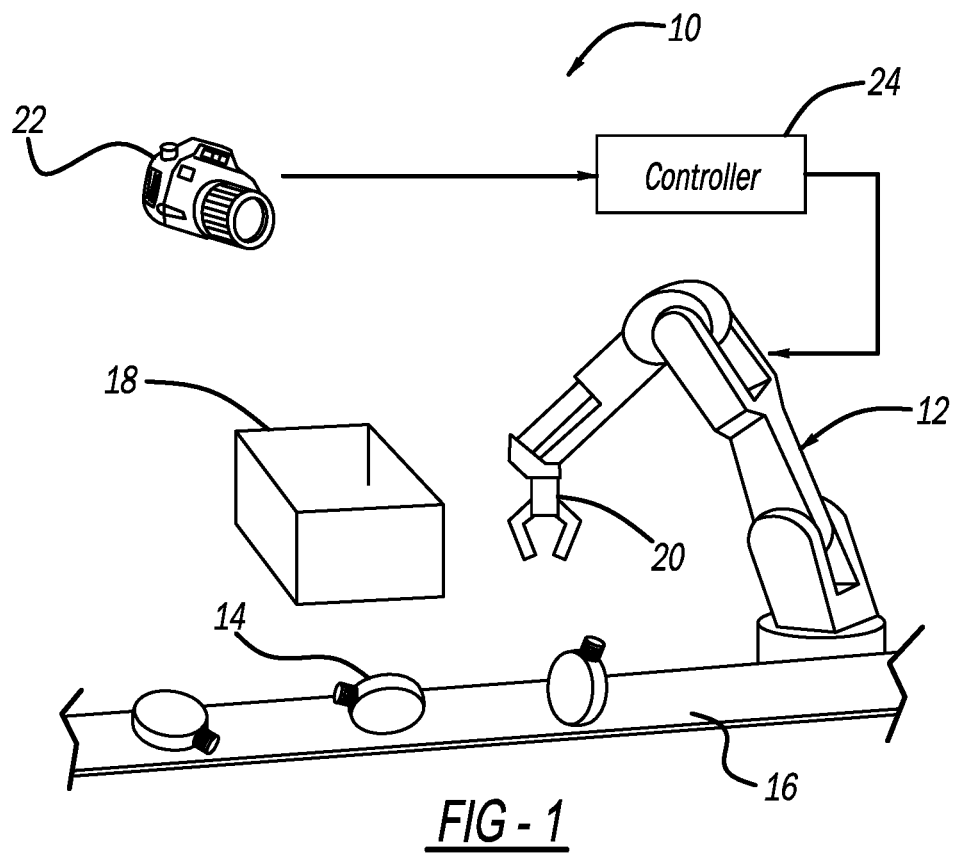
FIG. 1 is an illustration of a robotic system including a robot picking up objects off of a conveyor belt and placing them in a bin, where the system employs a 2D camera for taking 2D images of the objects and a controller for calculating a 3D pose of the objects using the 2D images.

FIG. 1 is an illustration of a robotic system 10 including a robot 12 that is picking up objects 14 off of a conveyor belt 16 and placing them in a collection bin 18. The system 10 is intended to represent any type of robotic system that can benefit from the discussion herein, where the robot 12 can be any robot suitable for that purpose. Each object 14 has a different orientation and location on the conveyor belt 16 relative to the other objects 14 as they move down along on the conveyor belt 16. In order for the robot 12 to effectively grasp and pick up the objects 14 it needs to be able to position an end-effector 20 on the robot 12 at the proper location and orientation before it grabs the object 14. To accomplish this, the system 10 includes a 2D camera 22 provided at a desired location relative to the objects 14 that provides 2D images to a robot controller 24 that controls the robot 12 to move the end-effector 20. As will be discussed in detail below, the robot controller 24 employs algorithms to convert the 2D images from the camera 22 to a 3D pose of the objects 14 so as to properly direct the end-effector 20.

Figure 2:
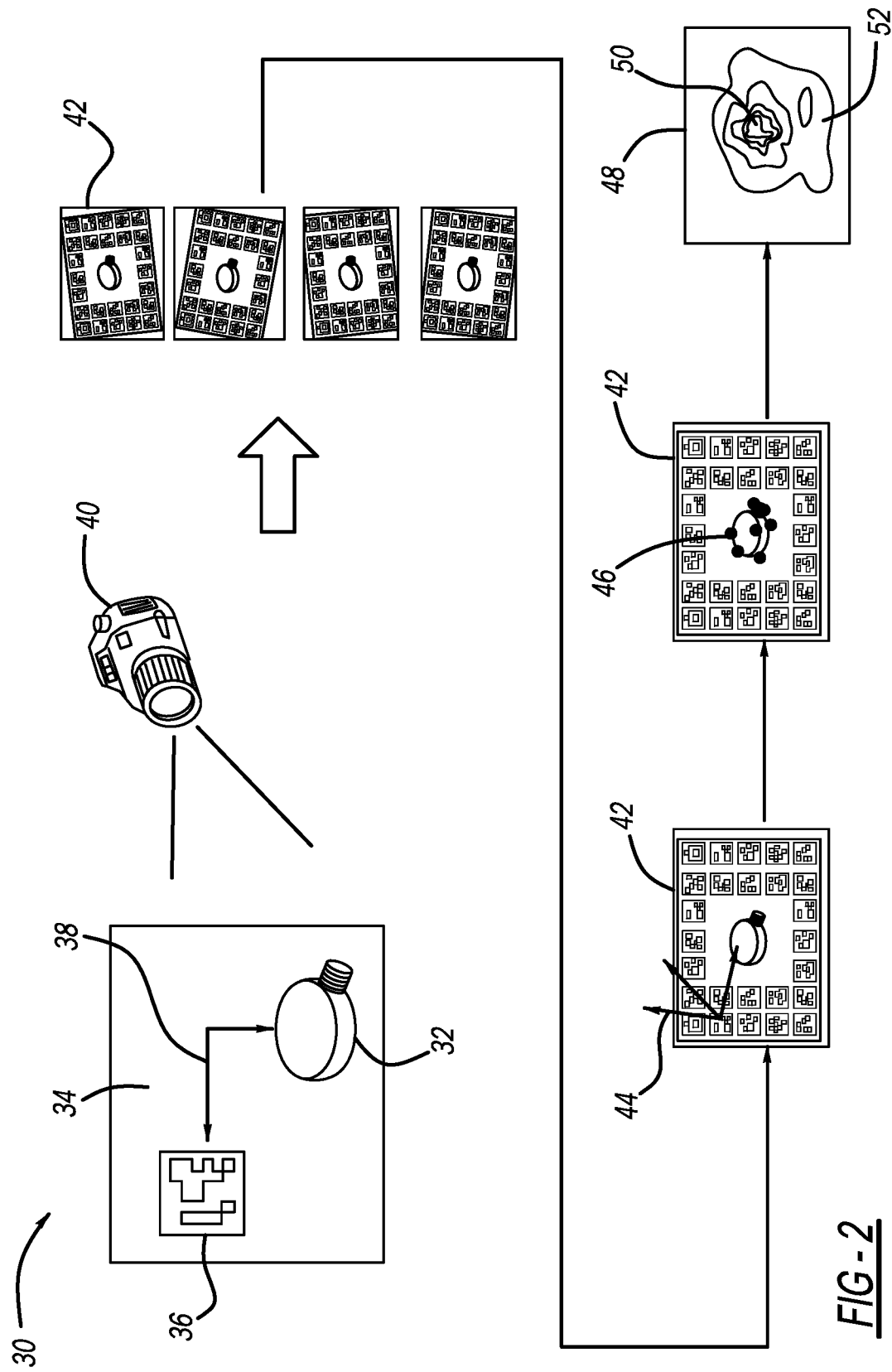
FIG. 2 is a flow-type diagram showing a process for obtaining a data set from an object using a 2D camera for training a neural network.

As will be discussed, in order for the controller 24 to accurately determine the 3D pose of the objects 14, in one embodiment a learned-based neural network is employed in the algorithms and software running in the controller 24 that extract objects features, where the neural network needs to be trained with data obtained from representative objects. FIG. 2 is a flow-type diagram 30 showing a process for obtaining image data from an object 32 that is identical to the objects 14 in the system 10 using a 2D camera 40 that will be used to train a neural network. The object 32 is placed on a marker board 34 having a suitable number of markers 36 with a special detectable design that will be used to identify the ground truth or actual position of the object 32, where only one of the markers 36 is shown on the board 34, and an offset distance represented by line 38 between the marker 34 and the object 32 is measured.

The camera 40 provides one or more 2D images 42 of the marker board 34, here four images, at different angles. The process then performs a projection on the images 42 to determine the rotation and position of one of the markers 36 as identified by a coordinate frame 44. The algorithm then adds the previously measured offset between the marker 36 and the object 32 to the rotation and position of the marker 36 to determine the rotation and position of the object 32. Once the true location of the object 32 is determined, the location of feature points 46, such as corners, on the object 32 can be calculated using known feature point extraction processes, where a minimum of four feature points is required. An algorithm that may employ, for example, a Gaussian distribution process, looks at each feature point 46 identified in the image 42 and generates a "heatmap" 48 for that point 46, where each heatmap 48 identifies by color intensity the probability that one of the feature points of the object 32 exists at a certain location. For example, the location in the image 42 where a feature point is believed to be, such as in area 50, would be assigned a certain color, such as red, and as the probability is reduced that the feature point exists at a location moving away from the area 50, the color changes to, for example, blue, such as in area 52.

Figure 3:
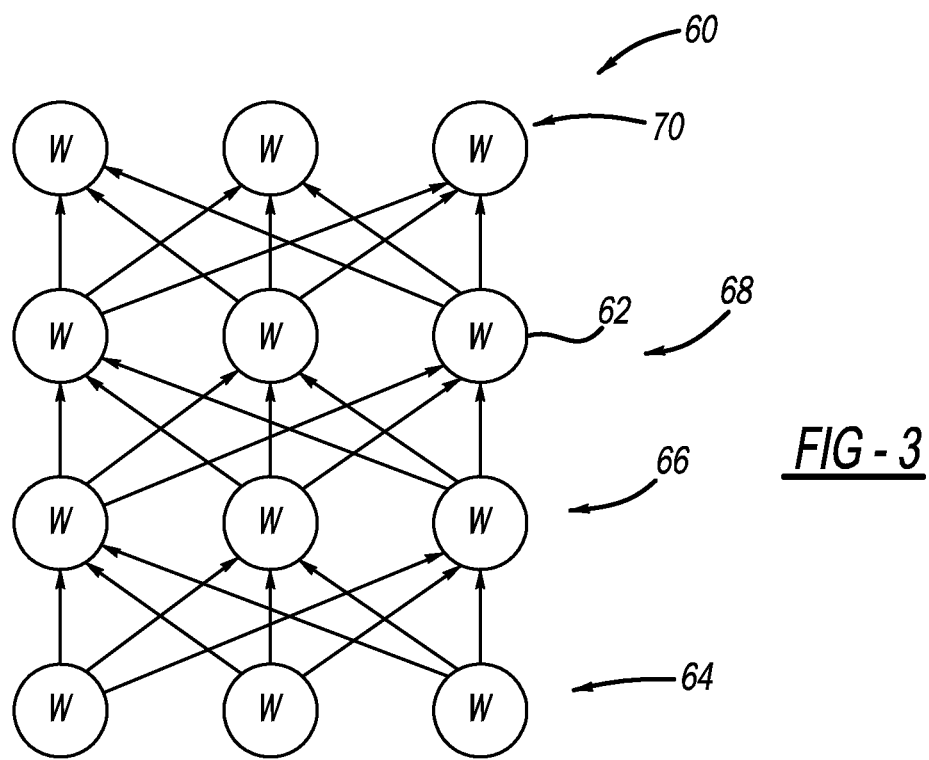
FIG. 3 is an illustration of a neural network including a plurality of nodes each having an adjustable weight.

The data provided by the 2D images 42 and the corresponding heatmaps 48 generated by the process shown in the diagram 30 are then used to train a neural network using known AI training schemes that will then be used in the system 10 to identify the 3D pose of the objects 14. FIG. 3 is an illustration of a neural network 60 including a plurality of nodes 62 each having an adjustable weight W, where the network 60 is intended to generally represent the neural network discussed herein. The neural network 60 includes an input layer 64 that receives the individual pixel data from the 2D images, multiple residual block layers 66 and 68 that identify features in the pixel data of the 2D images, and multiple convolutional layers 70, where each node 62 in the convolutional layers 70 provides a heatmap. It is noted that the convolutional layers 70 and the residual block layers 66 and 68 are standard modules utilized in the domain of deep learning. These types of convolutional layers consist of multiple filter kernels that perform convolutional operations to the input of images or the previous convolutional layers so that edges, textures or contour information can be extracted from the input. A residual block layer is a structure containing two convolutional layers with skip connection, where the output of the second convolutional layer is added to the input of the first convolutional layer to serve as the block output.

Figure 4:
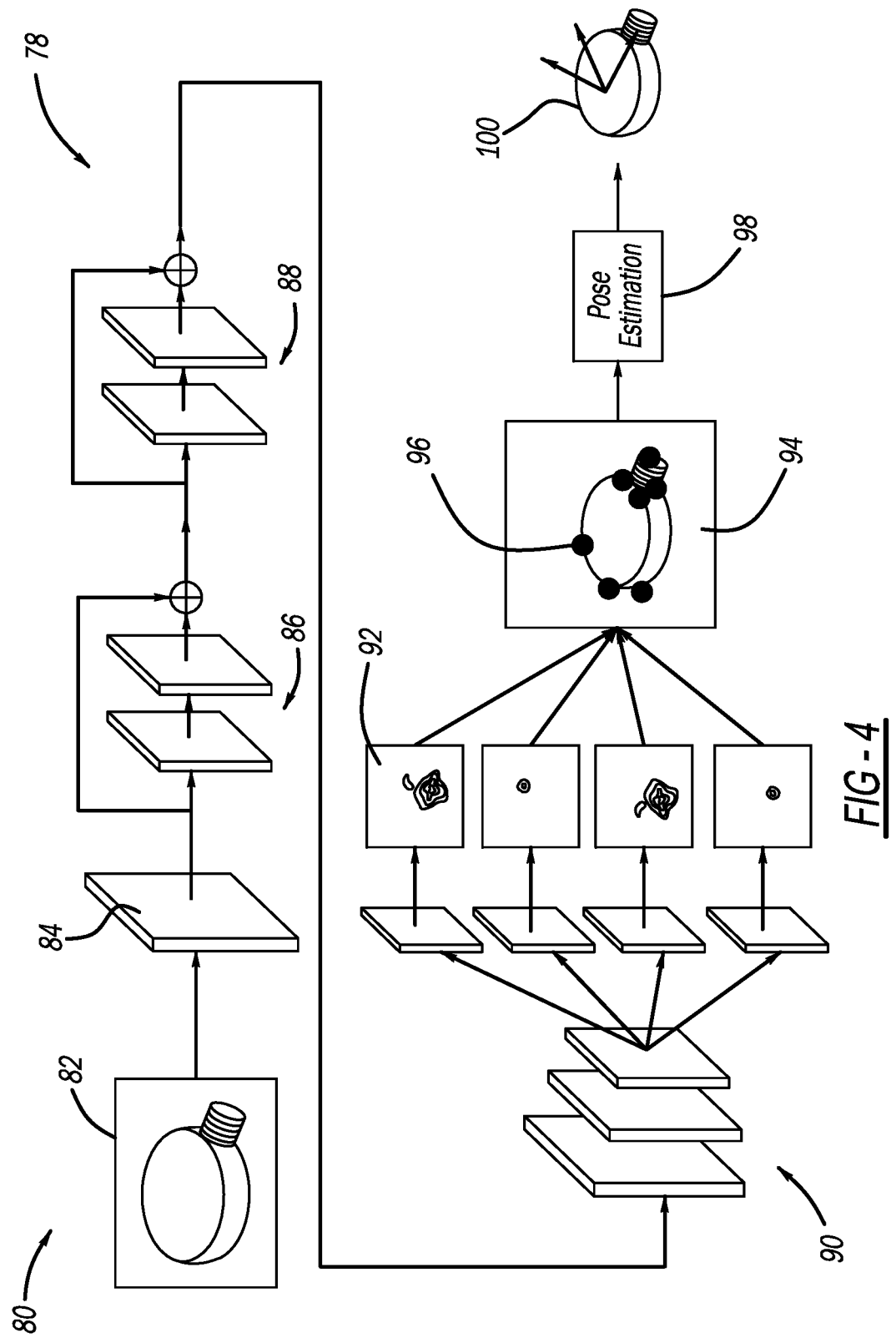
FIG. 4 is a flow-type diagram showing a learned-based neural network process for using the trained neural network for estimating a 3D pose of an object using a 2D image of the object and a neural network.

FIG. 4 is a flow-type diagram 80 showing an algorithm operating in the controller 24 that employs a learned-based neural network 78 using the trained neural network to estimate the 3D pose of the objects 14 from a 2D image 82 of the objects 14 taken by the camera 22. The image 82 is provided to an input layer 84 and multiple consecutive residual block layers 86 and 88 that include a feed-forward loop in the neural network 78 operating in the AI software in the controller 24 that provide feature extraction, such as gradients, edges, contours, etc., of possible feature points on the object 14 in the image 82 using a filtering process. The images including the extracted features are provided to multiple consecutive convolutional layers 90 in the neural network 78 that define the possible feature points obtained from the extracted features as a series of heatmaps 92, one for each of the feature points, that illustrate the likelihood of where the feature point exists on the object 14 based on color in the heatmap 92. An image 94 is generated using the image 82 of the object 14 that includes feature points 96 for all of the feature points from all of the heatmaps 92, where each feature point 96 is assigned a confidence value based on the color of the heatmap 92 for that feature point, and where those feature points 96 that do not have a confidence value above a certain threshold are not used.

The image 94 is then compared to a nominal or virtual 3D CAD model of the object 14 that has the same feature points in a pose estimation processor 98 to provide an estimated 3D pose 100 of the object 14. One suitable algorithm for comparing the image 94 to the CAD model is known in the art as perspective-n-point (PnP). Generally, the PnP process estimates the pose of an object with respect to a calibrated camera given a set of n 3D points of the object in the world coordinate frame and their corresponding 2D projections in an image from the camera. The pose includes six degrees-of-freedom (DOF) that are made up of the rotation (roll, pitch and yaw) and 3D translation of the object with respect to the camera coordinate frame.

Figure 5:
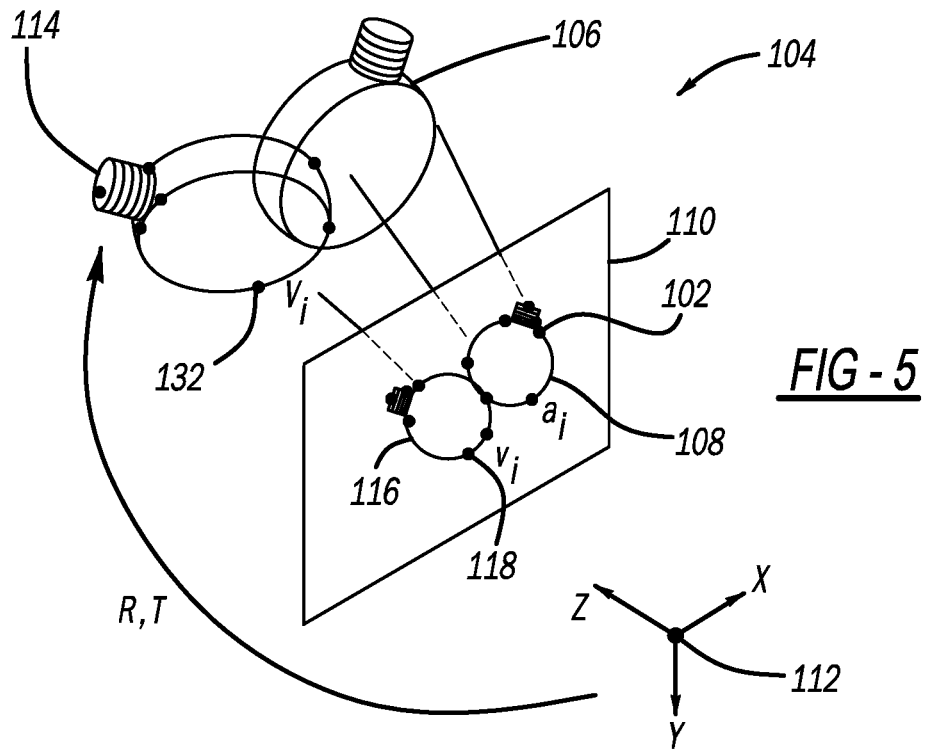
FIG. 5 is an illustration depicting a perspective-n-point (PnP) process for determining a 3D pose estimation of the object in the process shown in FIG. 4.

FIG. 5 is an illustration 104 of how the PnP process may be implemented in this example to obtain the 3D pose of the object 14. The illustration 104 shows a 3D object 106, representing the object 14, at a ground truth or real location. The object 106 is observed by a camera 112, representing the camera 22, and projected as a 2D object image 108 on a 2D image plane 110, where the object image 108 represents the image 94 and where points 102 on the image 108 are feature points predicted by the neural network 78, representing the points 96. The illustration 104 also shows a virtual 3D CAD model 114 of the object 14 having feature points 132 at the same location as the feature points 96 that is randomly placed in front of the camera 112 and is projected as a 2D model image 116 on the image plane 110 also including projected feature points 118. The CAD model 114 is rotated and translated in front of the camera 112, which rotates and translates the model image 116 in an attempt to minimize the distance between each of the feature points 118 on the model image 116 and the corresponding feature points 102 on the object image 108, i.e., align the images 116 and 108. Once the model image 116 is aligned with the object image 108 as best as possible, the pose of the CAD model 114 with respect to the camera 112 is the estimated 3D pose 100 of the object 14.

This analysis is depicted by equation (1) for one of the corresponding feature points between the images 108 and 116, where equation (1) is used for all of the feature points of the images 108 and 116.

$$\min_{(R,T)} \Sigma_{i=1}^{l}(v_i-a_i)'(v_i-a_i),$$

$$\text{s.t.} v_i = \text{project}(RV_i+T), \forall i \quad (1)$$

where $V_i$ is one of the feature points 132 on the CAD model 114, $v_i$ is the corresponding projected feature point 102 in the model image 116, $a_i$ is one of the feature points 102 on the object image 108, R is the rotation and T is the translation of the CAD model 114 both with respect to the camera 112, symbol ' is the vector transpose, and $\forall$ refers to any feature point with index i. By solving equation (1) with an optimization solver, the optimal rotation and translation can be calculated, thus providing the estimation of the 3D pose 100 of the object 14.

The process discussed above that employs a learned-based neural network for estimating the 3D pose of the object 14 provides a high level of accuracy. However, improvements can be made. For example, a small pixel error of the 2D projection of the object 14 on the image plane 110 in the x or y axis orthogonal to the optical z-axis of the camera 112 causes a relatively large error in the z-axis that could significantly create object position uncertainty and reduce 3D pose estimation performance. Therefore, this disclosure also proposes a 3D pose estimation process that reduces the z-axis uncertainty by using multiple cameras.

Figure 6:
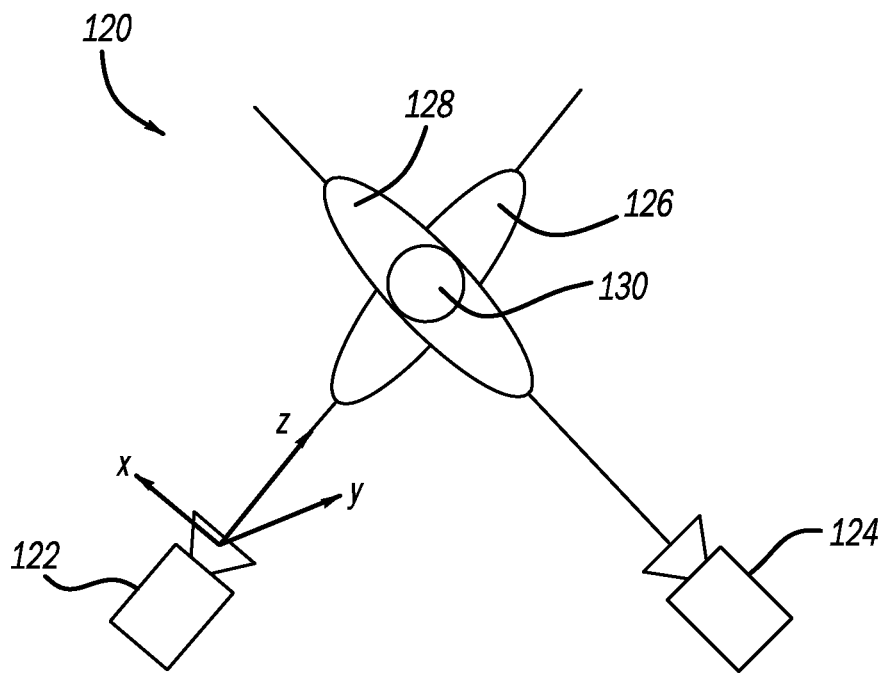
FIG. 6 is an illustration of a camera system employing multiple cameras for imaging an object.

FIG. 6 is an illustration of a camera system 120 including a first camera 122 and a second camera 124 oriented relative to an x, y and z coordinate frame, where the z-axis is along the optical axis of the cameras 122 and 124. An uncertainty region 126 is shown depicting the limitation in accuracy that images from the camera 122 are able to estimate the location of the object 14 and an uncertainty region 128 is shown depicting the limitation in accuracy that images from the camera 124 are able to estimate the location of the object 14. As is illustrated, both of the cameras 122 and 124 are highly accurate in the x and y axes, but are limited in accuracy in the z-axis, where the accuracy in all of the axes is subject to the distance between the camera 122 or 124 and the object 14 being imaged. However, by fusing the 3D pose estimation provided by both of the cameras 122 and 124, the accuracy of estimating the 3D pose of the object 14 in the z-axis is considerably improved as shown by uncertainty region 130. In other words, for this illustration, the z-axis of one of the cameras 122 and 124 is the x-axis for the other camera 122 and 124 so that the general uncertainty of the estimation process is the uncertainty in the x-axis direction.

In this non-limiting embodiment, the cameras 122 and 124 are oriented so that the optical axes of the cameras 122 and 124 are orthogonal to each other and have an optimal distance from the camera 122 or 124 to the object 14 to provide the minimal uncertainty region 130. However, a real system may be limited as to where the cameras 122 and 124 can be positioned with the z-axes relative to each other and the distance between the camera 122 or 124 and the object 14 along with other limiting factors, such as lighting, type of cameras being used, etc., which might lead to non-orthogonal optical axes and other limitations. In those systems, it may be desirable to employ more than two cameras to reduce the size of the uncertainty region to be closer to the minimum uncertainty region 130.

Figure 7:
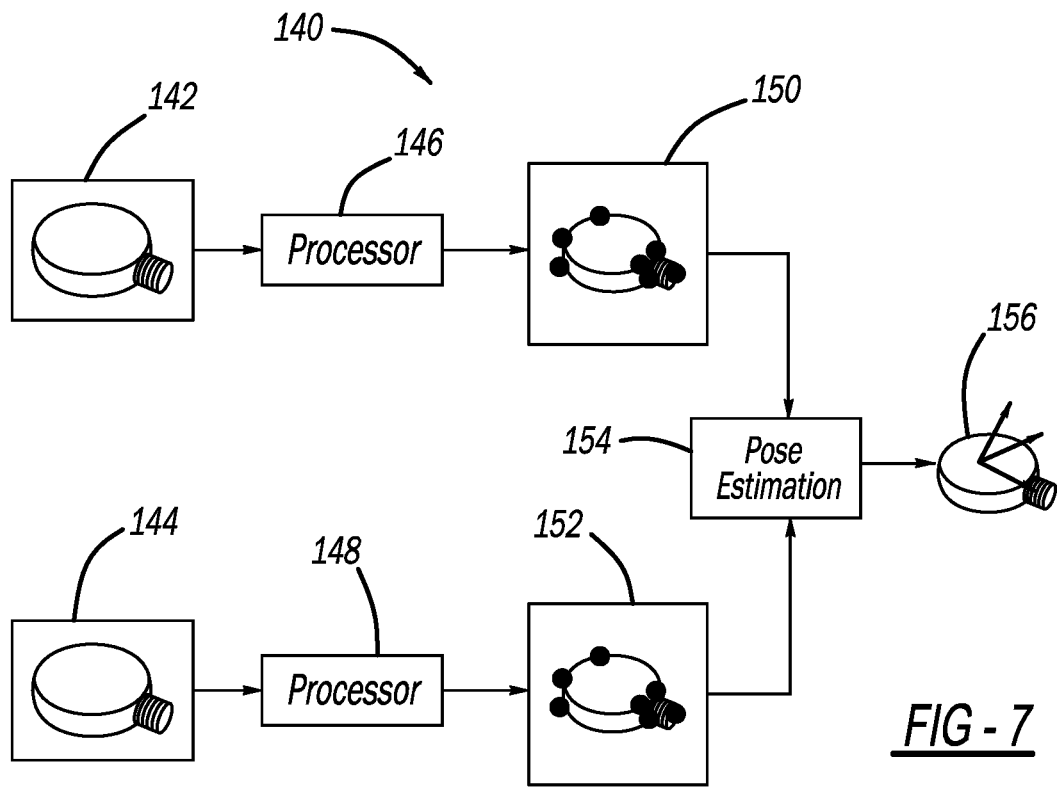
FIG. 7 is a block diagram of a system for estimating the 3D pose of an object using multiple 2D cameras.

FIG. 7 is a block diagram of a system 140 for estimating the 3D pose of the object 14 using the 2D cameras 122 and 124 and a learned-based neural network of the type discussed above. The camera 122 provides 2D images 142 and the camera 124 provides 2D images 144 of the object 14 at their respective angles. The images 142 are provided to a processor 146 and the images 144 are provided to a processor 148 that generate feature point images 150 and 152, respectively, similar to the image 94 from their perspective, where the processors 146 and 148 use, for example, the input layer 84, the multiple consecutive residual block layers 86 and 88, and the multiple consecutive convolutional layers 90 to generate heatmaps that are then used to generate the images 150 and 152 in the manner discussed above. The images 150 and 152 are fused in a pose estimation block 154 that generates a more accurate estimated 3D pose 156 of the object 14 than what the single camera 22 could provide, where the pose estimation process also uses a PnP algorithm as discussed above.

Figure 8:
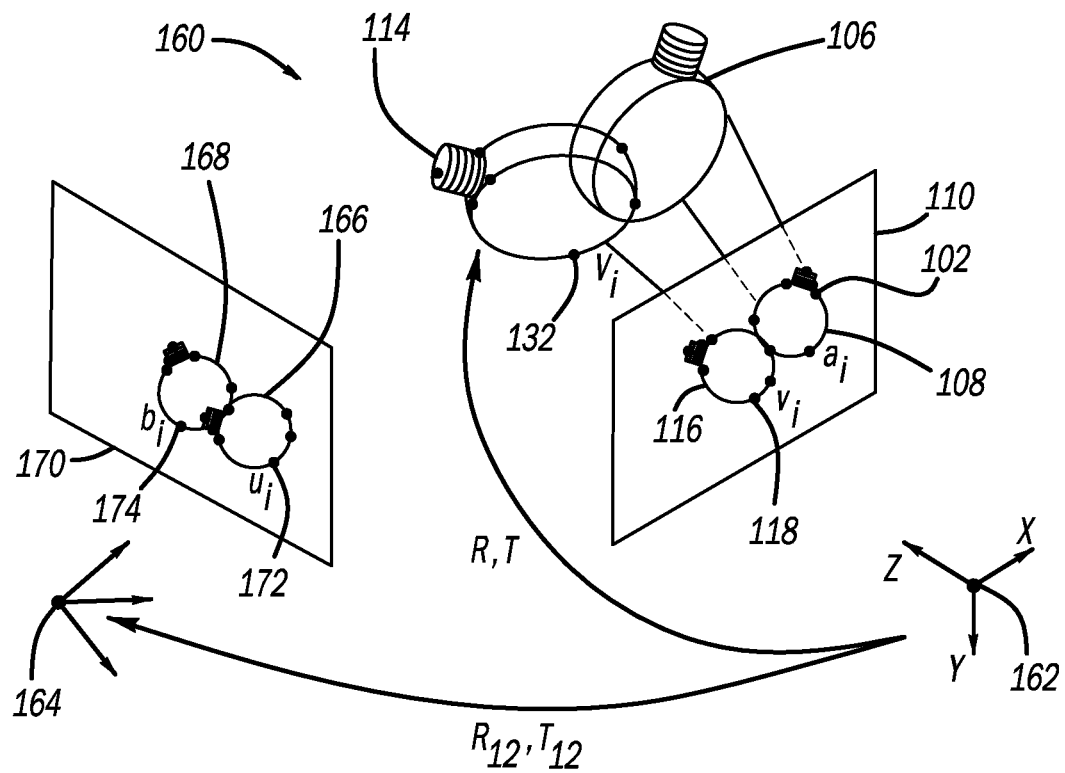
FIG. 8 is an illustration depicting a PnP process for estimating the 3D pose estimation of the object in the system shown in FIG. 7.

FIG. 8 is an illustration 160 similar to the illustration 104, where like elements are identified by the same reference number, depicting the PnP process for image fusion in the block 154, as discussed. In the illustration 160, a camera 162 represents the camera 122 and a camera 164 represents the camera 124. The illustration 160 shows a 2D model image 166 having feature points 172 that is a projection of the CAD model 114 on a 2D image plane 170 for the camera 164 and a 2D object image 168 having feature points 174 that is a projection of the 3D object 106 on the image plane 170 for the camera 164. The CAD model 114 is rotated and translated in front of the cameras 162 and 164 to obtain the optimal model pose for both of the cameras 162 and 164 at the same time where the feature points 118 on the model image 116 on the image plane 110 are as close as possible to the feature points 102 on the object image 108 and the feature points 172 on the model image 166 on the image plane 170 are as close as possible to the feature points 174 on the object image 168. Once this is obtained, the optimal orientation of the 3D model 114 is obtained, which represents the 3D pose of the object 14.

This analysis is depicted by equation (2) for one of the corresponding feature points between the images 108 and 116 and the images 166 and 168, where equation (2) is used for all of the feature points of the images 108 and 116 and the images 166 and 168.

$$\min_{(R,T)} \sum_{i=1}^{I} [(v_i - a_i)'(v_i - a_i) + (u_i - b_i)'(u_i - b_i)] \quad (2)$$
$$\text{s.t. } v_i = \text{project}(RV_i + T), \forall i$$
$$u_i = \text{project}[R_{12}(RV_i + T) + T_{12}], \forall i$$

where $u_i$ is one of the feature points 172 on the model image 166 and $b_i$ is the corresponding feature point 174 on the object image 168.

The techniques discussed above for extracting features from the 2D images to obtain a 3D pose estimation of the object 14 using a learned-based neural network is one suitable feature extraction technique. There are others. The following discussion describes a feature extraction technique that employs deep learning and vector field estimation that can replace the learned-based technique also with satisfactory results. As will be discussed in detail below, the vector field estimation process replaces the neural network 78 including the input layer 84, the multiple consecutive residual block layers 86 and 88, and the multiple consecutive convolutional layers 90 that generate the heatmaps 92 with vector field estimation elements. It is stressed, however, that although the vector field estimation process is described herein for obtaining a 3D pose of an object, the process will have application for any suitable process that requires feature extraction from an image.

Figure 9:
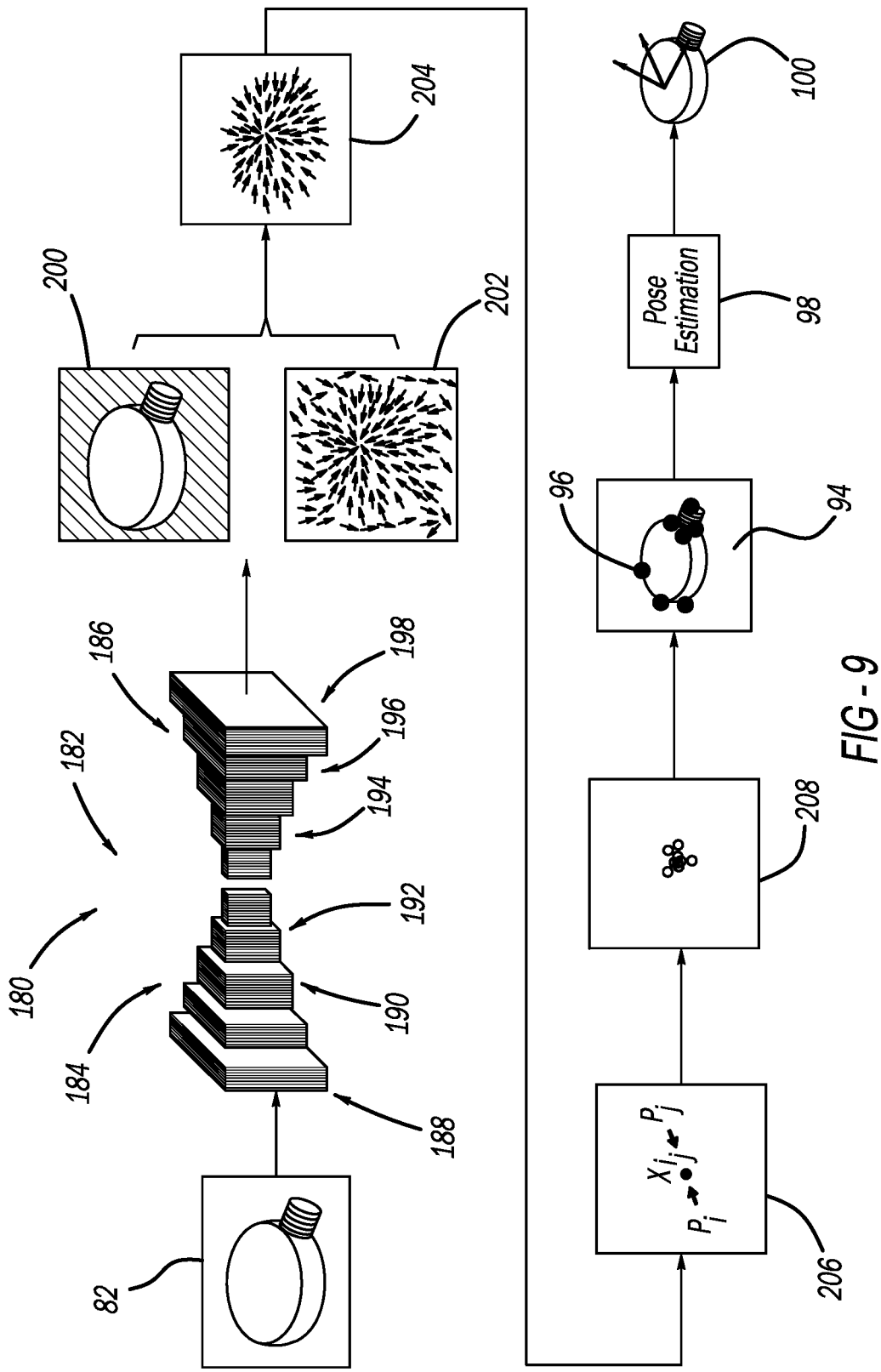
FIG. 9 is a flow-type diagram showing a vector field estimation process for predicting feature points on an object.

FIG. 9 is a flow-type diagram 180 showing a vector field estimation process operating in the controller 24 for generating a 3D pose of the object 14 using the 2D images 82 of the object 14 taken by the camera 22, where like elements are identified by the same reference number. The image input is a three-channel RGB (red-green-blue) image defined by a three-dimensional matrix N*N*3, where N is the height and width of the image 82. The image 82 is provided to an encoder/decoder neural network 182 including an encoder network 184 that extracts possible key features in the image 82 and a decoder network 186 that generates images from the extracted features to identify possible feature points on the object 14, discussed below, where both of the networks 184 and 186 include a number of neural network layers of the type discussed above. Particularly, in one non-limiting embodiment, the neural network layers in the encoder network 184 include convolutional layers 188, batch normalization (BN) layers 190 and rectified linear unit (ReLu) layers 192, and the neural network layers in the decoder network 186 include pooling layers 194, upsampling layers 196 and softmax layers 198.

The network 182 processes the three-dimensional matrix of the image 82 and produces from the three channels a one-dimensional (N*N*1) mask image 200 and a two-dimensional (N*N*2) vector field image 202 for each identified feature point. To generate the mask image 200, the network 182 assigns each pixel in the image 82 a digital one or zero depending on whether part of the object 14 is present in the particular pixel, where the pixels in the light areas of the mask image 200 have a digital one and the pixels in the dark areas of the mask image 200 have a digital zero. Each vector field image 202 includes a number of arrows that are each defined by an x-direction vector value and a y-direction vector value provided for each pixel in the image 82, where the direction of the arrow is towards one of the feature points in the image 82, and thus each pixel in the image 82 has the ability to predict the direction to that feature. The values of the pixels in the mask image 200 are multiplied by the values of the corresponding pixels in the vector field image 202 so that those arrows that are not associated with a pixel having part of the object 14 and do not provide a useful direction to the feature point are discarded, as shown by the vector field extraction image 204.

Each arrow in the vector field extraction image 204 provides a direction to one of the feature points, but do not provide a distance to that feature point. Thus, for every combination of two object pixels $p_i$ and $p_j$ in the vector field extraction image 204 that have a value, the process identifies a point $x_{ij}$ where their vectors $v_i$ and $v_j$ will intersect, as shown by vector intersection image 206. Each point $x_{ij}$ is assigned a score depending on the distance between the pixel $p_i$ and the point $x_{ij}$ and between the pixel $p_j$ and the point $x_{ij}$ and the gradient magnitude at the pixels $p_i$ and $p_j$. For example, a smaller distance between the pixel $p_i$ and the point $x_{ij}$ and between the pixel $p_j$ and the point $x_{ij}$ provides a higher score and a higher gradient magnitude at the pixels $p_i$ and $p_j$ provides a higher score. The result is a grid with many points $x_{ij}$ each having a score, where the area in the image having most of the points $x_{ij}$ will identify a likely feature point location, as shown by a point voting image 208.

The vector field image 202 shows vector arrows for one of the possible feature points identified by the network 182. The network 182 would also generate a separate vector field image 202 for each possible feature point that is multiplied by the mask 200. All of the feature points for all of the point voting images 208 would be combined into a single image, such as the image 94 including the feature points 96, where each separate one of the feature points 96 is provided by one of the point voting images 208. The image 94 can then be subjected to the PnP process in the pose estimation processor 98 to generate the 3D pose 100 in the manner discussed above. Further, because of the uncertainty along the optical axis for a single camera as discussed above, multiple cameras can be employed where the images from those cameras each would be processed by the vector field estimation process.

As mentioned, the vector field estimation process may have application for other processes requiring feature point extraction. For example, one application in robotics looks for a center of an object being picked by a robot, where the orientation of the object is not necessary. Another application could be determining the measurement of an object for quality assurances purposes.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for estimating a 3D pose of an object, said method comprising:
    positioning a first 2D camera so that it is directed towards the object along a first optical axis;
    obtaining 2D images of the object by the first 2D camera;
    extracting features points including gradients, edges and contours on the object from the 2D images from the first 2D camera using a first feature extraction process that includes a learned-based neural network;
    positioning a second 2D camera so that it is directed towards the object along a second optical axis where the first and second optical axes are at an angle relative to each other;
    obtaining 2D images of the object by the second 2D camera;
    extracting feature points including gradients, edges and contours on the object from the 2D images from the second 2D camera using a second feature extraction process that includes a learned-based neural network; and
    estimating the 3D pose of the object using the extracted feature points from both of the first and second feature extraction process, wherein estimating the 3D pose of the object using the extracted feature points from both of the first and second feature extraction process includes using a modified perspective-n-point algorithm that compares a 2D projection of a 3D virtual model of the object with a 2D projection of the object having feature locations for both of the first and second feature extraction processes and then performs a joint optimization to search for an optimal object pose that minimizes total projection errors calculated in the 2D images from both the first and second 2D cameras.

2. The method according to claim 1 wherein the first and second axes are orthogonal to each other.

3. The method according to claim 1 wherein the first and second feature extraction processes train weights of nodes in the neural network from a collected training set using a representative object of the object.

4. The method according to claim 3 wherein the first and second feature extraction processes generate a heatmap for each of the extracted feature points that identifies the probability of a location of the feature point on the object and convert each heatmap to locations of feature points on the object by searching for a pixel with a largest value across the heatmap.

5. The method according to claim 4 wherein the probability of a location of the feature point in the heatmap is shown as a color on the heatmap.

6. The method according to claim 4 wherein the probability of a location of the feature point on the object is assigned a confidence value that it is a feature.

7. The method according to claim 1 wherein the first and second feature extraction processes both use a vector field estimation process.

8. The method according to claim 1 wherein the method is employed in a robotic system and the object is being picked up a robot.

9. A method for estimating a 3D pose of an object, said method comprising:
    positioning a first 2D camera so that it is directed towards the object along a first optical axis;
    obtaining 2D images of the object by the first 2D camera;
    extracting feature points including gradients, edges and contours on the object from the 2D images from the first 2D camera using a first feature extraction process that employs a learned-based neural network where weights of nodes in the neural network are trained from a collected training set using a representative object of the object;
    positioning a second 2D camera so that it is directed towards the object along a second optical axis where the first and second optical axes are at an angle relative to each other;
    obtaining 2D images of the object by the second 2D camera;
    extracting feature points including gradients, edges and contours on the object from the 2D images from the second 2D camera using a second feature extraction process that employs a learned-based neural network where weights of nodes in the neural network are trained from a collected training set using a representative object of the object; and
    estimating the 3D pose of the object using the extracted feature points from both of the first and second feature extraction process, wherein estimating the 3D pose of the object using the extracted feature points includes using a modified perspective-n-point algorithm that compares a 2D projection of a 3D virtual model of the object with a 2D projection of the object having feature locations for both of the first and second feature extraction processes and then performs a joint optimization to search for an optimal object pose that minimizes total projection errors calculated in the 2D images from both the first and second 2D cameras.

10. The method according to claim 9 wherein the first and second axes are orthogonal to each other.

11. The method according to claim 9 wherein the first and second feature extraction processes both extract a plurality of feature points on the object from the 2D images using the neural network, generate a heatmap for each of the extracted feature points that identifies the probability of a location of the feature on the object and convert each heatmap to locations of features on the object by searching for a pixel with a largest value across the heatmap.

12. The method according to claim 11 wherein the probability of a location of the feature point in the heatmap is shown as a color on the heatmap.

13. The method according to claim 9 wherein the probability of a location of the feature point on the object is assigned a confidence value that it is a feature.

14. A system for estimating a 3D pose of an object, said system comprising:

means for positioning a first 2D camera so that it is directed towards the object along a first optical axis;

means for obtaining 2D images of the object by the first 2D camera;

means for extracting feature points including gradients, edges and contours on the object from the 2D images from the first 2D camera using a first feature extraction process that includes a learned-based neural network;

means for positioning a second 2D camera so that it is directed towards the object along a second optical axis where the first and second optical axes are at an angle relative to each other;

means for obtaining 2D images of the object by the second 2D camera;

means for extracting feature points including gradients, edges and contours on the object from the 2D images from the second 2D camera using a second feature extraction process that includes a learned-based neural network; and means for estimating the 3D pose of the object using the extracted features from both of the first and second feature extraction process, wherein the means for estimating the 3D pose of the object using the extracted feature points from both of the first and second feature extraction process uses a modified perspective-n-point algorithm that compares a 2D projection of a 3D virtual model of the object with a 2D projection of the object having feature locations for both of the first and second feature extraction processes and then performs a joint optimization to search for an optimal object pose that minimizes total projection errors calculated in the 2D images from both the first and second 2D cameras.

15. The system according to claim 14 wherein the first and second axes are orthogonal to each other.

16. The system according to claim 14 wherein the first and second feature extraction processes train weights of nodes in the neural network from a collected training set using a representative object of the object.

17. The system according to claim 14 wherein the first and second feature extraction processes both use a vector field estimation process.

18. A method for estimating a 3D pose of an object, said method comprising:

positioning a first 2D camera so that it is directed towards the object along a first optical axis;

obtaining 2D images of the object by the first 2D camera;

extracting features points including gradients, edges and contours on the object from the 2D images from the first 2D camera using a first feature extraction process that includes a learned-based neural network;

positioning a second 2D camera so that it is directed towards the object along a second optical axis where the first and second optical axes are at an angle relative to each other;

obtaining 2D images of the object by the second 2D camera;

extracting feature points including gradients, edges and contours on the object from the 2D images from the second 2D camera using a second feature extraction process that includes a learned-based neural network; and estimating the 3D pose of the object using the extracted feature points from both of the first and second feature extraction process, wherein the neural network used in the first and second extraction processes generates a separate vector field image for each extracted feature point that includes an arrow having an x-direction value and a y-direction value for each pixel in the vector field image, where a direction of each arrow is towards the extracted feature point in the vector field image, and wherein the vector field estimation process identifies intersection points of the arrows to identify a feature location for each separate vector field image.

* * * * *